United States Patent [19]
Hara

[11] Patent Number: 5,191,639
[45] Date of Patent: Mar. 2, 1993

[54] MIRROR IMAGE METHOD FOR USE IN A ROBOT

[75] Inventor: Ryuichi Hara, Oshino, Japan
[73] Assignee: Fanuc Limited, Minamitsura, Japan
[21] Appl. No.: 408,489
[22] PCT Filed: Apr. 17, 1989
[86] PCT No.: PCT/JP89/00409
 § 371 Date: Aug. 23, 1989
 § 102(e) Date: Aug. 23, 1989
[87] PCT Pub. No.: WO89/10589
 PCT Pub. Date: Feb. 11, 1989

[30] Foreign Application Priority Data
Apr. 23, 1988 [JP] Japan .................... 63-99318

[51] Int. Cl.⁵ .............. G05B 13/00; G05B 19/415
[52] U.S. Cl. ........................... 395/99; 395/86; 395/97; 901/3
[58] Field of Search ........... 364/513; 362/296; 395/82, 84, 87, 97, 99, 86; 901/3

[56] References Cited
U.S. PATENT DOCUMENTS

| | | | |
|---|---|---|---|
| 4,495,588 | 1/1985 | Nio et al. | 364/191 |
| 4,613,943 | 9/1986 | Miyake et al. | 364/513 |
| 4,639,878 | 1/1987 | Day et al. | 364/513 |
| 4,683,544 | 6/1987 | Hariki | 364/513 |

Primary Examiner—Michael R. Fleming
Assistant Examiner—George Davis
Attorney, Agent, or Firm—Staas & Halsey

[57] ABSTRACT

A method of preparing a mirror image program and for providing mirror image drive of a robot. The method according to the present invention is capable of determining a mirror image attitude which is symmetrical with a tool attitude with respect to a mirror plane.

On the basis of a teaching program prepared by a first robot, which responds to an operator's input of teaching points and the operator's setting of a mirror coordinate system, a second robot effects a coordinate transformation by calculating the product $(M^{-1}P)$ of an inverse matrix $M^{-1}$) of a matrix (M) representing the mirror coordinate system and a matrix (P) representing a teaching point in a fixed coordinate system, and inverts respective sign of components, perpendicular to the mirror plane, of an attitude vector and a position vector in the product $(M^{-1}P)$ in order to obtain a matrix $((M^{-1}P)')$, and further obtains and stores the product $((M(M^{-1}P)')$ of the matrix $((M^{-1}P)')$ and the matrix (M). The tool attitude at the respective teaching point in the mirror image program, prepared by repetitively performing the aforesaid processisng, is symmetrical with the tool attitude at the teaching point in the teaching program with respect to the mirror plane. Mirror image drive may be provided by supplying a robot mechasnism section with the product $(M(M^{-1}P)')$.

10 Claims, 3 Drawing Sheets

MIRROR IMAGE METHOD FOR USE IN A ROBOT

BACKGROUND OF THE INVENTION

1. Field of the Invention

The present invention relates to a mirror image method for use in an industrial robot, and more particularly, to a method for preparing a mirror image program for mirror image drive.

2. Description of the Background Art

In an industrial robot, it is conventionally known to utilize a mirror image function of the robot so as to determine mirror image points of teaching points associated with one side of a work object. The determined mirror image points are used as teaching points associated with the other side of the work object. Operations, at opposite sides of the work object are carried out on the basis of the aforementioned two kinds of teaching points in a symmetrical manner with respect to a plane passing through an axis of the work object. As shown in FIG. 3, it is also known to symmetrically dispose, with respect to a work object 53 on a working line 52, a first robot 50 responsive to a teaching program, and a second robot 51 responsive to a program containing therein, as teaching points, mirror image points of teaching points contained in the teaching program. The robots 50 and 51 simultaneously carry out operations, symmetrical with each other with respect to the work object 53, at opposite sides of the work object 53.

Conventionally, in a robot of the above-mentioned type, a mirror image 54' of the position of a tool tip point 54 and a mirror image 55' of the position and attitude of a tool mounting center 55 are determined with respect to a mirror plane 56, as shown by way of example in FIG. 4. Then a program according to mirror images is prepared on the basis of these mirror images 54', 55' and a teaching program. In this respect, the conventional art entails drawbacks, e.g., the attitude of the mirror image T' is unsymmetrical with that of the tool T with respect to the mirror plane 56, as shown in FIG. 4.

SUMMARY OF THE INVENTION

The object of the present invention is to provide a mirror image method for use in a robot, which is capable of determining a mirror image attitude which is symmetrical with a tool attitude.

To achieve the aforementioned object, a mirror image method according to the present invention comprises steps of; (a) preparing a teaching program on the basis of teaching points represented by a first coordinate system; (b) setting a second coordinate system in a such a manner that two coordinate axes of said second coordinate system define a mirror plane; (c) effecting a coordinate transformation associated with a respective one of said teaching points from said first coordinate system to said second coordinate system; (d) determining, in said second coordinate system, a mirror image point which is symmetrical with said teaching point with respect to said mirror plane; and (e) effecting a coordinate transformation associated with said mirror image point from said second coordinate system to said first coordinate system.

According to the present invention, mirror image points in a second coordinate system, having two coordinate axes defining a mirror plane, are determined through a coordinate transformation, associated with a teaching point represented by a first coordinate system, from the first coordinate system to the second coordinate system. Then, a coordinate transformation, associated with a mirror image point, from the second coordinate system to the first coordinate system is carried out. Accordingly, it is possible to prepare a mirror image program and achieve mirror image drive, in which a mirror image attitude is symmetrical with a tool attitude.

DESCRIPTION OF THE PREFERRED EMBODIMENT

Figure 2:
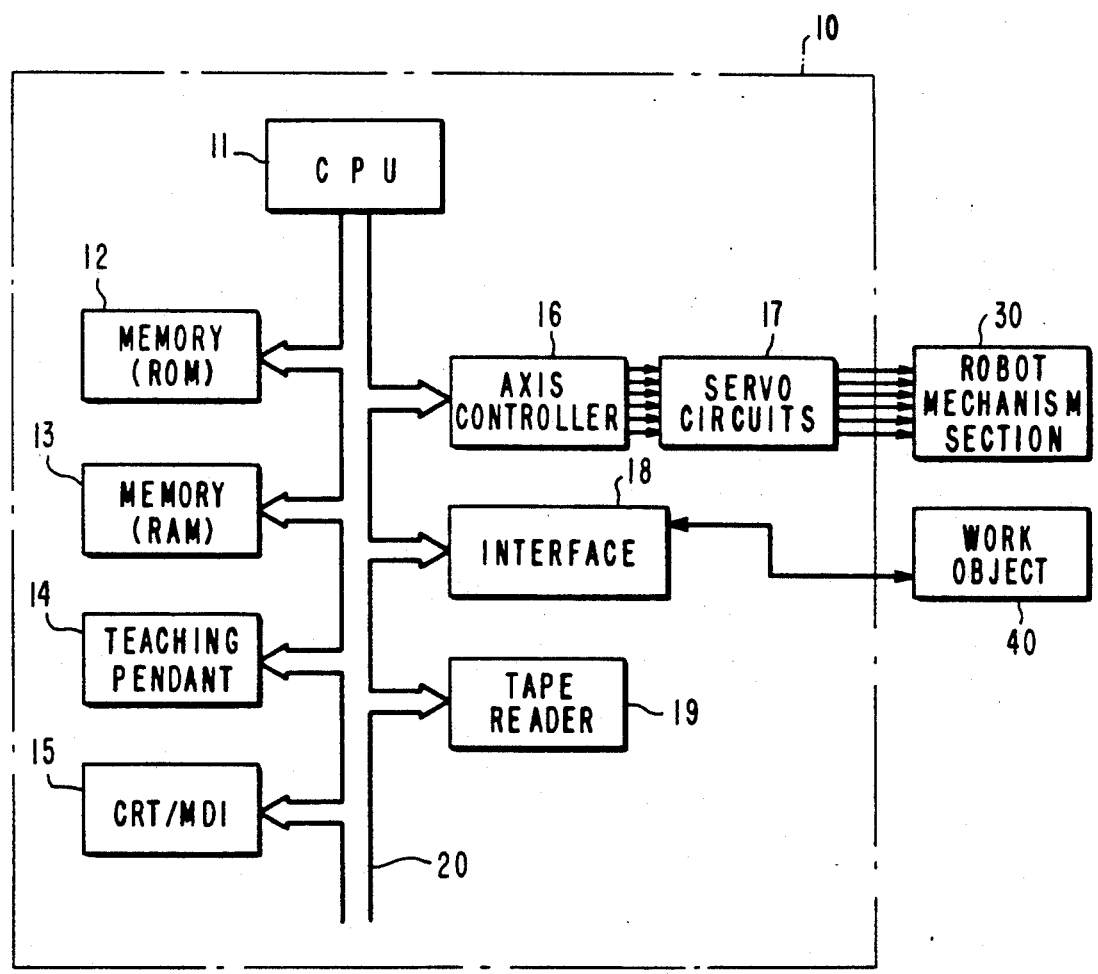
FIG. 2 is a block diagram showing an essential part of an industrial robot to which the mirror image method of FIG. 1 is applied.
Figure 3:
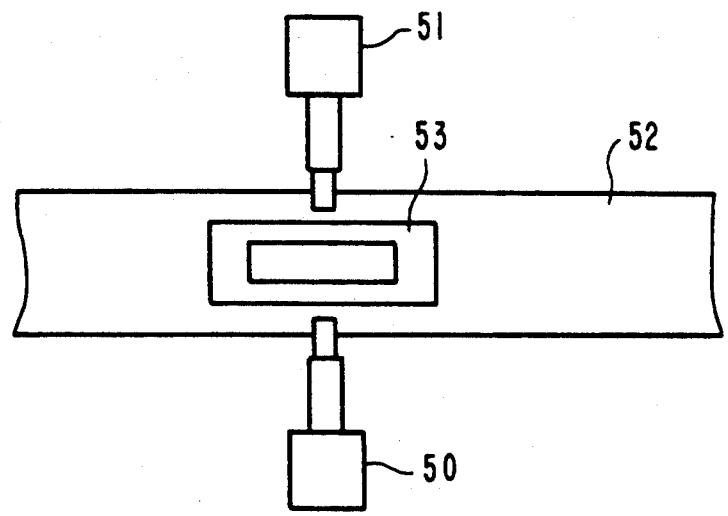
FIG. 3 is a schematic plane view showing, by way of example, an operation performed by a robot having a mirror image function.
Figure 4:
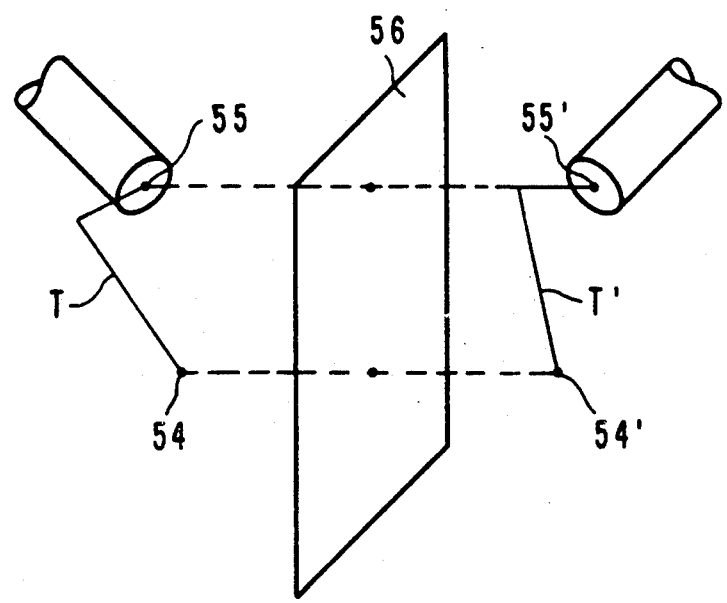
FIG. 4 is a schematic perspective view showing a mirror image method in a conventional robot.

A system to which a mirror image method according to an embodiment of the present invention is applied, comprises first and second industrial robots which are disposed symmetrical with each other with respect to a work object on a working line for simultaneously performing symmetric operations at opposite sides of the work object with respect to the work object. As shown in FIG. 2, each of the robots is arranged basically in a conventional manner, and comprises a control unit 10, and a robot mechanism section 30 for performing an operation onto the work object 40 under the control of the control unit 10.

Connected through busses 20 to a central processing unit (hereinafter referred to as CPU) 11 of the control unit 10 are: a memory 12 comprised of a ROM; a memory 13 comprised of a RAM; a teaching pendant 14; a manual data input device (hereinafter referred to as CRT/MDI) 15 with a CRT display; and a tape reader 19. The memory 12 is arranged to store various control programs to be executed by the CPU 11, and the memory 13 is arranged to store a program taught through the teaching pendant 14 and the CRT/MDI 15, and store through the tape reader 19 a robot operation program prepared by off-line processing, for example.

The teaching pendant 14 is provided with numerical displays, lamps, operation buttons and the like, which are required for robot operations, and the CRT/MDI 15 is provided with mode change keys, character/numeral keys, cursor keys, and various function keys, so that command data are inputted to the robot through the teaching pendant 14 and the CRT/MDI 15.

Further connected through the busses 20 to the CPU 11 are an axis controller 16 accommodating therein interpolation devices, and an interface 18 for signal transmission and reception between the same interface and a sensor system (not shown) and the like associated with the work object 40, so that servomotors for individual axes of the robot mechanism section 30 are driven by servo circuits 17 connected to the axis controller 16.

Figure 1:
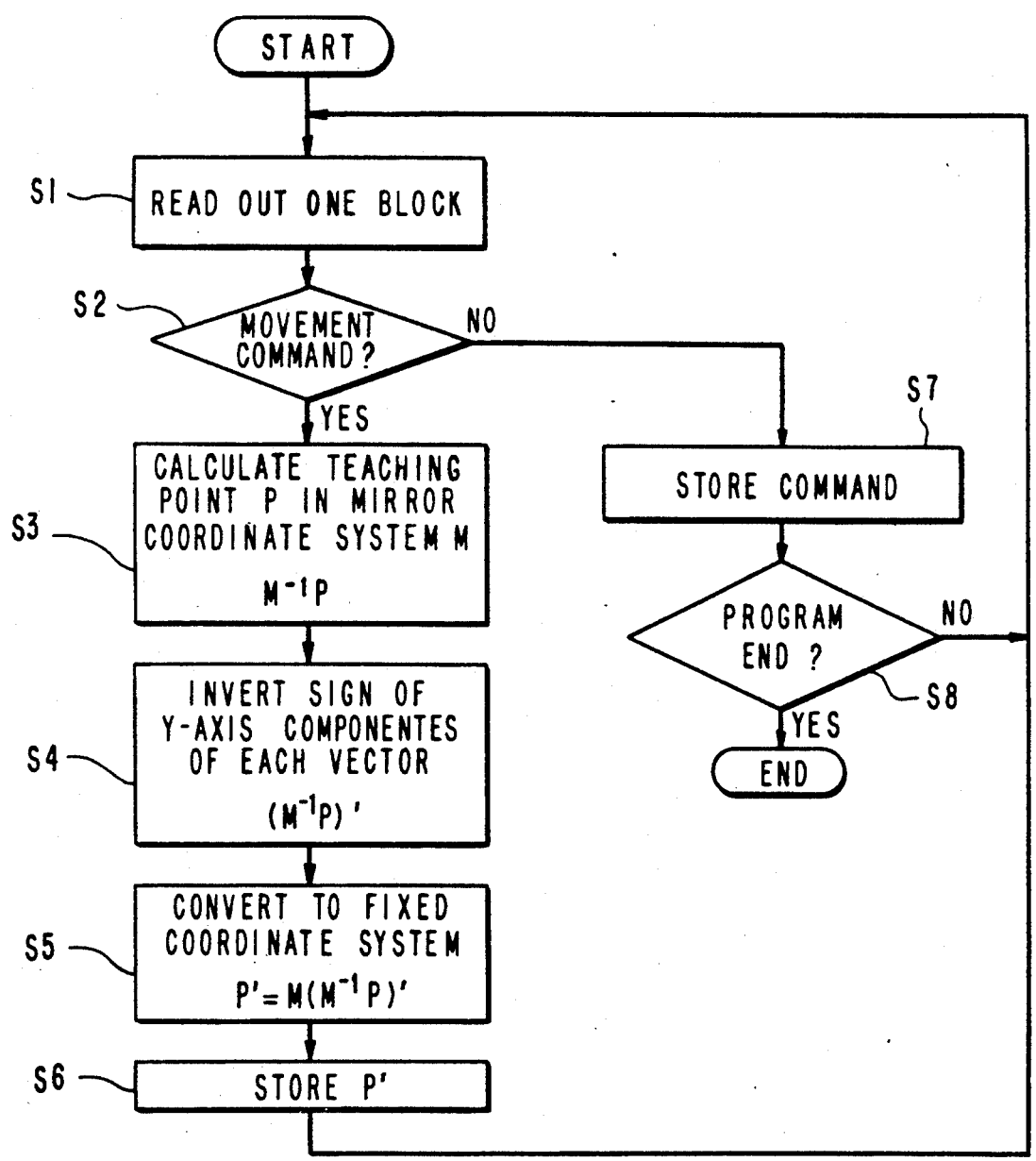
FIG. 1 is a flowchart of a control program for executing a mirror image method according to an embodiment of the present invention.

With reference to FIG. 1, operation of the system constructed as mentioned above will be now explained.

At first, an operator operates the teaching pendant 14 and the CRT/MDI 15 of the first robot, so as to teach the robot respective teaching points in a fixed coordinate system (e.g., a work coordinate system set on the work object 40) and to input desired command statements, under such a condition that a tool is kept at a desired attitude. Further, the operator operates the CRT/MDI 15 of the first robot to set a predetermined X-Y-Z coordinate system (hereinafter referred to as mirror coordinate system). Upon setting the mirror coordinate system, an X-Z plane including therein an X-coordinate axis and a Z-coordinate axis of this coordinate system is set in consistency with a mirror plane, i.e., a symmetric plane in operation of the first and second robots, which passes through the center of the work object 40.

Here, the position of the respective teaching point and the attitude of the tool at the teaching point in the fixed coordinate system are represented by position vector l (lx, ly, lz) in the fixed coordinate system, and normal vector n (nx, ny, nz), orientation vector o (ox, oy, oz) and approach vector a (ax, ay, az) in the fixed coordinate system. In other words, the following 4×4 matrix P is used for representation. Similarly, a 4×4 matrix M is used for representation of the position and attitude in the mirror coordinate system.

$$\begin{vmatrix} nx\,ox\,ax\,lx \\ ny\,oy\,ay\,ly \\ nz\,oz\,az\,lz \\ 0\ 0\ 0\ 1 \end{vmatrix}$$

In response to the aforesaid teaching operation by the operator, the first robot prepares a teaching program, and causes the memory 13 to store the same program, and further writes this teaching program into a magnetic tape through an appropriate means (not shown). Then, the operator sets this magnetic tape in the tape reader 19 of the second robot, and operates the CRT/MDI 15 of the second robot to start operation of the same robot in a mirror image program preparation mode.

At the start of the robot operation, the CPU 11 of the second robot reads out a first block of the teaching program (step S1), and determines whether a command stated in the block is a movement command or not (step S2). When it is determined that the movement command is stated, the CPU 11 calculates the product of a coordinate transformation matrix $M^{-2}$ (an inverse matrix of a matrix M representing the mirror coordinate system) and the aforementioned matrix P representing a teaching point in the fixed coordinate system and contained in the movement command, i.e., the matrix $M^{-1}P$ representing the teaching point in the mirror coordinate system (step S3). Next, the CPU 11 calculates a matrix $(M^{-1}P)'$ representing a mirror image point in the mirror coordinate system by inverting respective sign of components ny, oy, ay, ly, along a y-axis perpendicular to the mirror plane, of vectors n, o, a, l in this matrix $M^{-1}P$ (step S4). Further, the CPU 11 calculates the product of the matrix M and the matrix $(M^{-1}P)'$, i.e., the matrix $M(M^{-1}P)'$ representing the mirror image point in the fixed coordinate system, and causes the memory 13 to store the same (steps S5 and S6). The position of the mirror image point and the tool attitude at the mirror image point, which are represented by the matrix $M(M^{-1}P)'$ calculated in the above manner, are symmetrical with the position of the teaching point concerned and the tool attitude at the teaching point with respect to the mirror plane.

When the result of the determination at the step S2 is negative, i.e., when it is determined that the command stated in the block read at the step S1 is not a movement command, the same command is stored in the memory 13 (step S7), and then a determination is made as to whether or not this command represents a program end (step S8). If the result of this determination is negative, the processing of the step S1 and the subsequent steps is repetitively executed. Subsequently, preparation of a mirror image program based upon the teaching program is completed, and then the program end is determined at the step S8, whereby the mirror image program preparation processing of FIG. 1 is completed.

The first robot is driven in accordance with the teaching program, and at the same time, the second robot is driven in accordance with the mirror image program, so that operations are simultaneously carried out at opposite sides of the work object on the working line in a symmetrical manner with respect to the work object.

Although the mirror image program preparation processing is executed while the teaching program is inputted through the tape reader 19 in the aforesaid embodiment, similar mirror image program preparation processing may be made while the teaching program, stored in the memory 13 through the tape reader 19, which is a communication interface or the like, is read out therefrom.

Moreover, the mirror image operation may be immediately carried out, without the mirror image program being prepared. In this case, the robot mechanism section 30 is driven through the servo circuits 17 by supplying the axis controller 16 with a control signal representing the mirror image point, instead of execution of the mirror image point storage operation, at the step S6. Further, the command is executed instead of the command storage operation at the step S7.

I claim:

1. A mirror image method for use in a robot for machining a work object, comprising the steps of:
   (a) preparing teaching points represented in a first coordinate system;
   (b) defining a second coordinate system having two coordinate axes defining a mirror plane;
   (c) calculating a second coordinate system teaching point by transforming a respective one of said teaching points from said first coordinate system to said second coordinate system;
   (d) determining, in said second coordinate system, a mirror image point which is symmetrical with said respective one of said teaching points with respect to said mirror plane;
   (e) calculating a first coordinate system mirror image point by transforming said mirror image point from said second coordinate system to said first coordinate system and;
   (f) machining the work object by driving the robot based upon said first coordinate system mirror image point.

2. A mirror image method for use in a robot according to claim 1, wherein step (c) includes the substep of:
   calculating a third matrix, said third matrix being the product of a first matrix representing said respective one of said teaching points in said first coordinate system and an inverse matrix of a second matrix representing said second coordinate system, and said third matrix representing said respective one of said teaching points in said second coordinate system.

3. A mirror image method for use in a robot according to claim 2, wherein step (d) includes the substep of:
calculating a fourth matrix representing the mirror image point in said second coordinate system by inverting respective sign of components of an attitude vector and a position vector which are associated with said third matrix, said components being along an axis being perpendicular to said mirror plane.

4. A mirror image method for use in a robot according to claim 3, wherein step (e) includes the substep of:
calculating a fifth matrix, said fifth matrix being the product of said first matrix and said fourth matrix and representing the mirror image point in said first coordinate system.

5. A mirror image method for use in a robot according to claim 3, wherein:
said attitude vector includes a normal vector, an orientation vector and an approach vector.

6. A mirror image method for use in a robot, the robot having tool, comprising the steps of:
(a) preparing respective positions of teaching points and respective attitudes of the tool at said teaching points, said respective positions of said teaching points and said respective attitudes of the tool at said teaching points being represented by a first matrix in a first coordinate system;
(b) defining a second matrix in a second coordinate system such that two coordinates axes of said second coordinate system define a mirror plane;
(c) calculating a third matrix, said third matrix being the product of said first matrix and an inverse mirror matrix of said second matrix, said third matrix representing said position of said respective one of said teaching points and said attitude of the tool at said respective one of said teaching points in said second coordinate system;
(d) calculating a fourth matrix by inverting respective sign components of an attitude vector and a position vector which are associated with said third matrix, said respective sign components being along an axis perpendicular to said mirror plane, said fourth matrix representing a mirror image point which is symmetrical with said position of said respective one of said teaching points and said attitude of the tool at said respective one of said teaching points with respect to said mirror plane in said second coordinate system;
(e) calculating a fifth matrix, said fifth matrix being the product of said first matrix and said fourth matrix, said fifth matrix respresenting the mirror image point in said first coordinate system and;
(f) operating the tool based upon said fifth matrix.

7. A mirror image method for use in a robot according to claim 6, wherein:
said attitude vector includes a normal vector, an orientation vector, and an approach vector.

8. A method of preparing a mirror image program for use in a robot, comprising the steps of:
(a) preparing teaching points represented in a first coordinate system;
(b) defining a second coordinate system having two coordinate axes defining a mirror plane;
(c) calculating a second coordinate system teaching point by transforming a respective one of said teaching points from said first coordinate system to said second coordinate system;
(d) determining, in said second coordinate system, a mirror image point which is symmetrical with said respective one of said teaching points with respect to said mirror plane;
(e) calculating a first coordinate system mirror image point by transforming said mirror image point from said second coordinate system to said first coordinate system;
(f) repeating steps (c)–(e) for other ones of said teaching points;
(g) preparing the mirror image program based on each first coordinate system mirror image point calculated in step (e); and
(h) machining a work object by driving the robot based on the mirror image program.

9. A method as recited in claim 8, wherein step (e) includes the substep of storing said first coordinate mirror image point in a random access memory.

10. An apparatus for preparing a mirror image program for use in machining a work object, comprising:
means for designating teaching points represented in a first coordinate system;
means for defining a second coordinate system having two coordinate axes defining a mirror plane passing through the center of the work object;
means for calculating second coordinate system teaching points by transforming said teaching points from said first coordinate system to said second coordinate system;
means for determining, in said second coordinate system, mirror image points which are symmetrical with said second coordinate system teaching points with respect to said mirror plane;
means for calculating first coordinate system mirror image points by transforming said mirror image points from said second coordinate system to said first coordinate system;
a random access memory associated with said means for calculating first coordinate system mirror image points, said random access memory storing said first coordinate system mirror image points;
means for preparing the mirror image program on the basis of said first coordinate system mirror image points stored in said random access memory; and
means for machining the work object by driving a robot based on said mirror image program.

* * * * *